United States Patent
Bloodworth et al.

(10) Patent No.: US 7,023,647 B2
(45) Date of Patent: Apr. 4, 2006

(54) FLY HEIGHT CONTROL FOR A READ/WRITE HEAD IN A HARD DISK DRIVE

(75) Inventors: Bryan E. Bloodworth, Irving, TX (US); Congzhong Huang, Plano, TX (US); Michael Sheperek, Longmont, CO (US); Jeremy R. Kuehlwein, Woodbury, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/715,217

(22) Filed: Nov. 17, 2003

(65) Prior Publication Data
US 2005/0105204 A1    May 19, 2005

(51) Int. Cl.
*G11B 21/02* (2006.01)
(52) U.S. Cl. ........................................ 360/75
(58) Field of Classification Search ................ 360/75, 360/290, 294
See application file for complete search history.

(56) References Cited

U.S. PATENT DOCUMENTS

| | | |
|---|---|---|
| 5,991,113 A | 11/1999 | Meyer et al. |
| 6,578,816 B1 | 6/2003 | Lille |
| 2003/0099054 A1* | 5/2003 | Kamijima ............ 360/59 |
| 2004/0075940 A1* | 4/2004 | Bajorek et al. ........ 360/110 |

* cited by examiner

*Primary Examiner*—Andrew L. Sniezek
(74) *Attorney, Agent, or Firm*—W. Daniel Swayze, Jr.; W. James Brady; Frederick J. Telecky, Jr.

(57) ABSTRACT

A fly height controller (10FHC; 10FHC') for controlling the fly height of a read/write head assembly (15) in a disk drive (20) is disclosed. A heat element resistor (30) is disposed within the read/write head assembly (15). The fly height controller (10FHC; 10FHC') includes registers (32R, 32W) for storing digital data words corresponding to the desired drive levels to be applied to the heat element resistor (30) during read and write operations. The registers (32R, 32W) are selectively coupled to a steady-state digital-to-analog converter (DAC) (36), depending upon whether a read or write operation is occurring; the output of the steady-state DAC (36) is applied to a voltage driver (40), which in turn drives current into the heat element resistor (30). Overdrive and underdrive transistors (44P, 44N) are provided to over-drive and underdrive the input to the voltage driver (40) in transitions between read and write operations. An initial state register (50) receives a digital word indicating the desired current for the heat element resistor (30) when unselected; the output of the initial state register (50) is applied to an initial state DAC (52), which drives an initial state voltage driver (54). Control logic (35; 35') controls whether the steady-state voltage driver (40) or initial state voltage driver (54) drives the heat element resistor (30). The fly height controller (10FHC') may also be adapted to control the fly height of multiple read/write head assemblies (15) in a disk drive.

26 Claims, 4 Drawing Sheets

FLY HEIGHT CONTROL FOR A READ/WRITE HEAD IN A HARD DISK DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of disk drive control circuits, and is more specifically directed to a preamplifier for a read/write head in a hard disk drive.

Continuing progress toward higher performance yet less expensive personal computers, including both desktop workstations and portable computers, has resulted in large part from advances in nonvolatile data storage technology. As is well known in the art, the capacity of conventional disk drives has greatly increased over recent years, at ever decreasing cost per megabit. This capacity increase is directly related to improvements in the density with which data can be stored in a magnetic disk drive, particularly in "hard" disk drives (i.e., disk drives in which the magnetic disk is not removable from the location of the read/write heads). Advances in disk drive technology have decreased the surface area required to reliably and retrievably store a bit along a "track" on the disk surface, and have also decreased the spacing between adjacent tracks. This reduction in the active disk surface area per unit of storage has been enabled, in large part, by corresponding reductions in the size and precision of the magnetic transducers, commonly referred to as "heads", that effect the writing and reading operations in magnetic disk drives.

In conventional magnetic disk drives, the writing and reading of stored data is carried out by way of near-field magnetic processes. To write data, ferromagnetic domains at the disk surface are selectively oriented by applying a magnetic field in close proximity to the disk surface. One type of conventional write head is the well-known inductive writer, which includes an electromagnet having a gap that can be positioned near the magnetic disk surface. The electromagnet is selectively energized to establish a magnetic field, at the gap, that is strong enough to define a magnetic "transition pattern" of the desired polarity at the addressed location of the disk surface. Data is read from the disk by sensing the polarity of the magnetic field established by these magnetic transition patterns. Conventional read heads include inductive heads consisting of an electromagnet (which may be the same electromagnet used to write data) in which a current is induced by the magnetic fields at the disk surface; more recently, read heads are implemented by a magnetoresistive (MR) head having a resistance that varies with the polarity of the magnetic field.

In modern disk drives, the read/write heads are disposed within a "slider" at the distal end of a head gimbal assembly (HGA) suspension. The flexible HGA suspension is attached to an actuator, which includes a so-called "voice coil" motor that positions the heads at the desired locations of the disk surface. The relative motion between the spinning disk surface and the slider creates a lifting force on the slider, establishing an air bearing surface (ABS) on which the slider rides over the disk surface. Typically, the heads are located at the trailing edge of the slider, which is typically closer to the disk surface than is the slider leading edge.

In connection with these near-field mechanisms, the magnetic field strength varies exponentially as the distance between the magnetic transducers (read/write heads) and the magnetized disk surface shrinks. It has been observed that the areal density of data storage at the disk surface, for a given bit error rate (BER), depends strongly on the distance between the heads and the disk surface. The spacing maintained by the air bearing surface (ABS) between the read/write heads and the disk surface is referred to in the art as the "fly height" of the heads. In modern conventional disk drives, the mean fly height is on the order of a few nanometers. Low fly heights have enabled the very high areal densities attained in modern disk drives.

However, low fly heights tend to increase the wear of both the disk surface and the read-write heads. At extremely low fly heights, relatively small asperities in the disk surface can cause contact between the slider and the disk surface, depleting and degrading lubricants, causing wear on both the slider and the disk surface and causing contamination from wear particles, and in some cases causing the heads to stick at locations of the disk surface where contact is made.

Disk drive manufacturers are thus faced with a tradeoff between disk drive reliability, on one hand, and areal density and BER, on the other hand, in determining the desired fly height of the read/write heads. Accordingly, significant effort has been and is being expended in the art to provide extremely smooth magnetic disk surfaces, so that very low fly heights can be achieved while still providing reasonable disk durability. By way of further background, active control of the fly height by way of a micromechanical air valve is described in U.S. Pat. No. 6,578,816 B1.

It is also known that the writing current conducted by the inductive write head causes resistive heating at the read/write head, and in turn causes thermal expansion of the write head and, in some cases, also of the MR read head (or inductive read head, if present). This thermal expansion typically causes reduction in the fly height. But if the nominal fly height of the read/write head is already extremely small, this thermal expansion of the read/write head can cause contact between the disk surface and the read/write head, resulting in disk and head wear and in the degradation of the disk system described above.

By way of further background, it is known to include a resistor within the slider of a disk drive read/write head for controlling the fly height. An example of this construction is described in U.S. Pat. No. 5,991,113. As described in this reference, the application of a current to the resistor heats and thus expands the read/write heads, reducing the fly height of the read/write heads from the disk surface.

BRIEF SUMMARY OF THE INVENTION

It is therefore an object of this invention to provide a control circuit and method for controlling the fly height of read/write heads in a disk drive.

It is a further object of this invention to provide such a control circuit and method that controls fly height by controlling current through a heating resistor at the heads.

It is a further object of this invention to provide such a control circuit and method that accounts for increased resistive heating in write cycles relative to read cycles.

Other objects and advantages of this invention will be apparent to those of ordinary skill in the art having reference to the following specification together with its drawings.

The present invention may be implemented into a preamplifier circuit for controlling current applied to a heat element resistor located near the read/write heads in a magnetic disk drive. The circuit includes a driver that supplies the current to the heat element resistor according to separate programmable levels for read and write operations. The circuit also includes sensing circuitry for optimizing the fly height during operation.

According to another aspect of the invention, the preamplifier circuit includes programmable underdrive and overdrive functionality, for driving the heat element resistor during transitions between reads and writes. According to another aspect of the invention, the circuit is adaptable to independently control the fly height of multiple read/write heads, in a multiple platter disk drive.

DETAILED DESCRIPTION OF THE INVENTION

The present invention will be described in connection with its preferred embodiment, namely as implemented into a magnetic disk drive using an inductive write head and a magnetoresistive (MR) read head disposed in a slider having a heat element resistor. It is believed that this invention is especially beneficial in such an application. However, it will be appreciated that this invention may also be implemented in, and provide significant benefit to, disk drives of other types and construction, including disk drives utilizing different read and write head technology and mechanisms. Accordingly, it is to be understood that the following description is provided by way of example only, and is not intended to limit the true scope of this invention as claimed.

Figure 1:
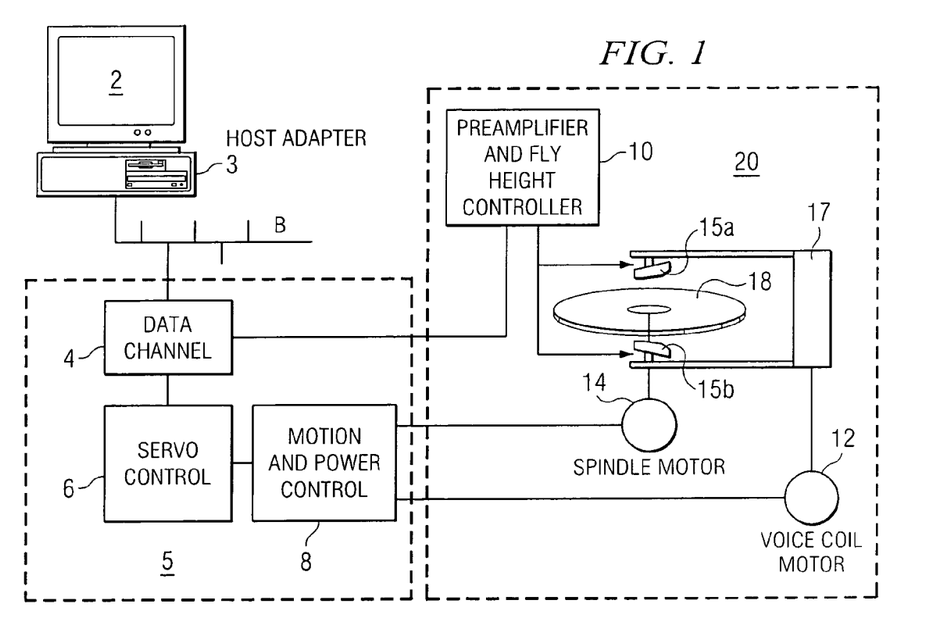
FIG. 1 is an electrical diagram, in block form, of a computer system including a hard disk drive subsystem and control circuitry, constructed according to the preferred embodiment of the invention.

FIG. 1 illustrates an exemplary example of a computer system into which the preferred embodiment of the invention is implemented. In this example, personal computer or workstation 2 is realized in the conventional manner, including the appropriate central processing unit (CPU), random access memory (RAM), video and sound cards or functionality, network interface capability, and the like. Also contained within computer 2 is host adapter 3, which connects on one side to the system bus of computer 2, and on the other side to bus B, to which disk drive controller 5 is connected. Bus B is preferably implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner.

Controller 5 is a conventional disk drive controller as known in the art. In modem disk drives in which the drive electronics is implemented at the disk drive rather than as a controller at computer 2 itself, controller 5 is implemented in a printed circuit board within the disk drive itself. Of course, in larger scale systems, controller 5 may be implemented within computer 2. In the generalized block diagram of FIG. 1, the components of controller 5 are shown according to their functions, rather than their physical integrated circuits, for the sake of clarity. Typical integrated circuits used to implement disk drive controllers such as controller 5 include a digital signal processor (DSP), read-only memory (ROM) and random access memory (RAM), other non-volatile storage such as flash RAM, interface circuitry connected to bus B, and other custom logic circuitry. Functionally, controller 5 includes data channel 4, which is interfaced with bus B and effects the function of communicating data to and from preamplifier 10 at head-disk assembly 20. Data channel 4 is also in communication with servo control 6, which may also include a demodulation function. Servo control 6 in turn communicates with motion and power controller 8, which drives voice coil motor 12 and spindle motor 14 in head-disk assembly 20.

Head-disk assembly 20 includes the electronic and mechanical components that are involved in the writing and reading of magnetically stored data. In this example, head-disk assembly 20 includes one or more disks 18 having ferromagnetic surfaces (preferably on both sides) that spin about their axis under the control of spindle motor 14. Multiple read/write head assemblies 15a, 15b are movable by actuator 17. Accordingly, signals from motion and power control function 8 in controller 5 control spindle motor 14 and voice coil motor 12 so that actuator 17 places the read/write head assemblies 15a, 15b at the desired locations of disk surface 18 to write or read the desired data.

Figure 2:
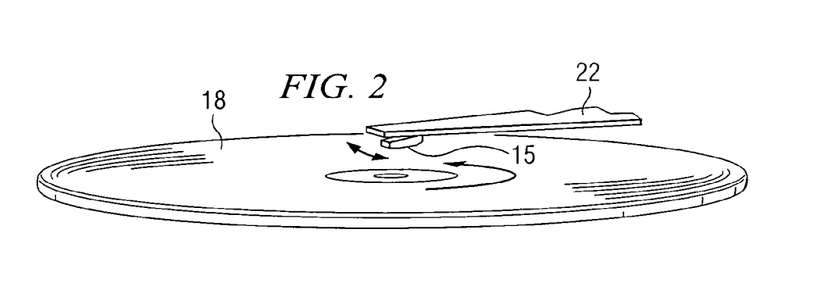
FIG. 2 is a plan view illustrating the construction of a portion of the hard disk drive in the system of FIG. 1.

FIG. 2 illustrates, in further detail, the physical arrangement of disk surface 18 relative to its associated read/write head assembly 15. Disk surface 18 is shown, in this example, as rotating in a primary direction (counterclockwise, in this example) about its axis; as known in the art, this rotation is effected by spindle motor 14 under the control of controller 5. As shown in FIG. 2, read/write head assembly 15 is disposed at the end of actuator arm 22, which is rotatable (about its axis, not shown) by actuator 17 as effected by voice coil motor 12. Rotation of actuator arm 22 will position read/write head assembly 15 at the appropriate radial distance of disk surface 18 to access the desired track.

Figure 3:
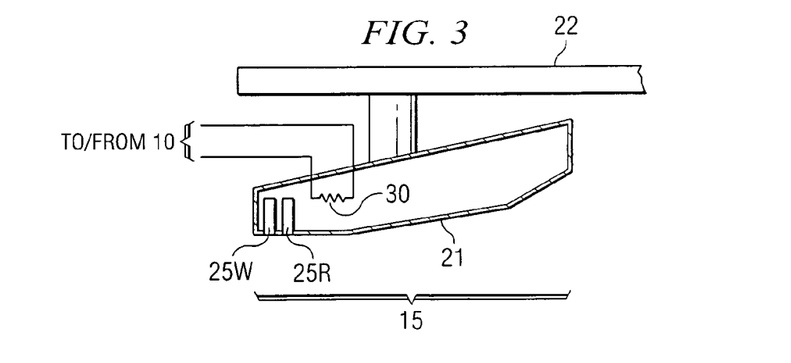
FIG. 3 is a cross-sectional view illustrating the construction of a read/write head assembly in the system of FIG. 1.

FIG. 3 illustrates the construction of read/write head assembly 15 according to the preferred embodiment of this invention. Read/write head assembly 15 includes slider 21, which is typically a ceramic, silicon, or other electrically insulating body into which read head 25R and write head 25W may be formed. The size and shape of slider 21 is designed to provide an air bearing surface (ABS) between it and rotating disk surface 18. Slider 21 is mounted to actuator arm 22 in the conventional manner.

Read head 25R and write head 25W are disposed near the trailing edge of slider 21, defined by the rotation of disk surface 18 (see FIG. 2). The particular construction and implementation of read and write heads 25R, 25W may vary, according to the desired disk drive performance. In this embodiment of the invention, write head 25W is preferably implemented as an inductive write head, including an electromagnet formed with windings about an iron core having a gap oriented toward the bottom of slider 21, to direct the field generated by a current through the windings toward the nearby disk surface 18. Read head 25R is preferably constructed as a magnetoresistive (MR) or giant magnetoresistive (GMR) material. For example, as known in the art, a GMR element is a "stripe" of a soft magnetic material, such as iron chromide (FeCr), which has a resistance value that varies with the polarity of a magnetic field applied to the element. Alternatively, read head 25R may also be implemented as an inductive read head, in which a current is induced into an electromagnet by the magnetic field of a portion of disk surface 18 moving nearby.

According to this embodiment of the invention, read/write head assembly 15 also includes heat element resistor 30, which is shown schematically in FIG. 3. Heat element resistor 30 may be a conventional resistor of various construction (e.g., a carbon body resistor), or alternatively constructed as a resistance heater in the manner known in the art. Heat element resistor 30 is disposed within slider 21, at an appropriate position so that it can readily heat write head 25W (and read head 25R, if constructed as an inductive head). As known in the art, the fly height of a disk drive head is typically defined by the distance between the inductive heads and the disk surface, and that thermal expansion of the inductive core of the head or heads, for example due to resistive heating by the current passing through the windings, ultimately defines this distance. According to this preferred embodiment of the invention, preamplifier and fly height controller 10 controls the current through heat element resistor 30, and thus controls the fly height of read/write head assembly 15, as will now be described relative to FIG. 4.

Figure 4:
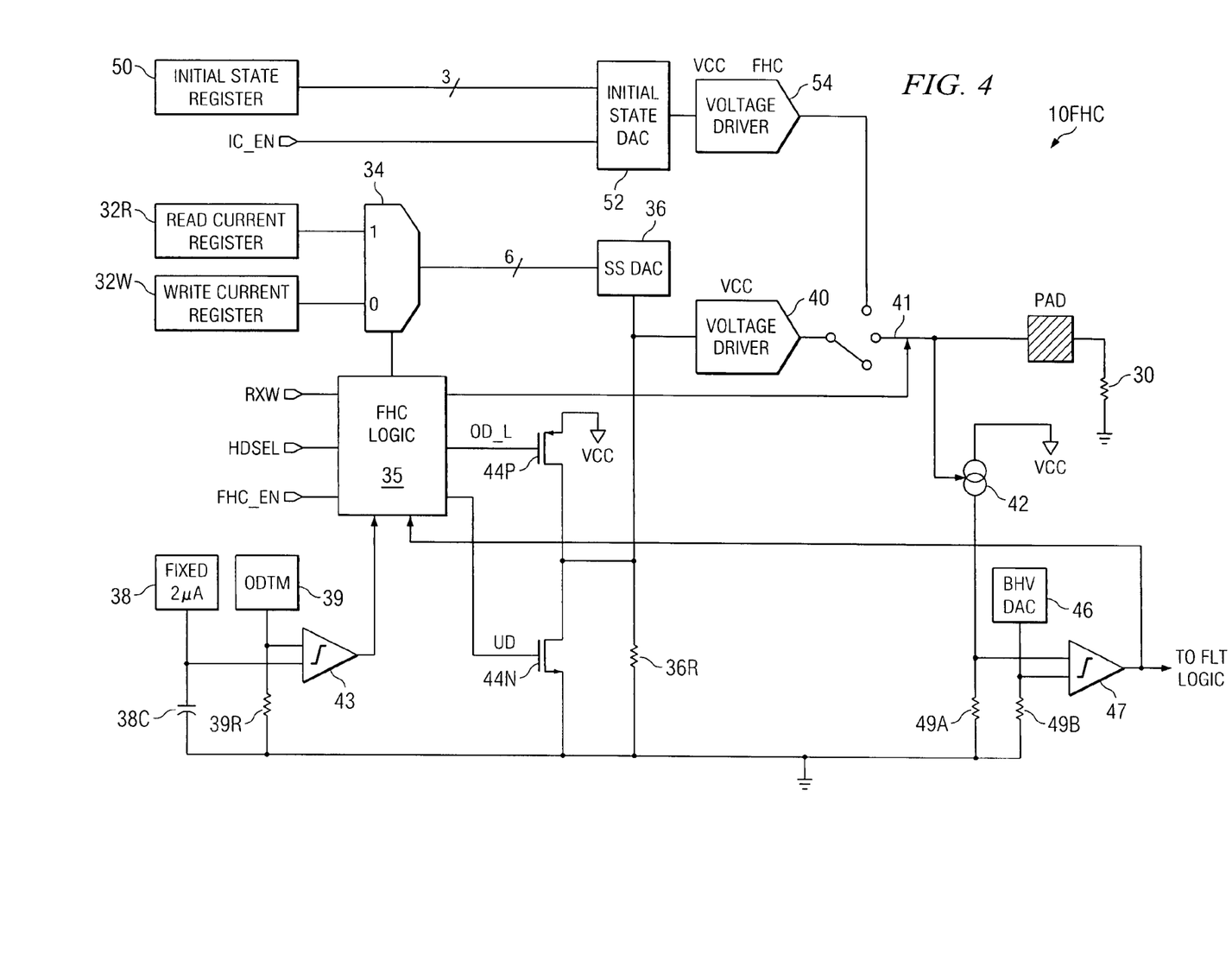
FIG. 4 is an electrical diagram, in schematic form, illustrating the construction of control circuitry for controlling a heat element resistor in the read/write head assembly, according to a first preferred embodiment of the invention.

FIG. 4 illustrates the construction of fly height controller 10FHC, which is a portion of preamplifier and fly height controller 10 in the system of FIG. 1. The portion of preamplifier and fly height controller 10 of FIG. 1 that is in the data path between controller 2 and read/write heads 15 is not shown in FIG. 4 for the sake of clarity; that data path portion of preamplifier and fly height controller 10 may be realized in the conventional manner. As shown in FIG. 4, fly height controller 10FHC drives resistor 30 from pad PAD. In this regard, preamplifier and fly height controller 10 is contemplated as being implemented by way of an integrated circuit, with pad PAD connected by a wire bond or otherwise to an external terminal of the integrated circuit, to which heat element resistor 30 is connected. Of course, those skilled in the art having reference to this specification will recognize that portions of preamplifier and fly height controller 10 may be instead realized by way of more than one integrated circuit or discrete components, or integrated into a larger scale integrated circuit. More specifically, it is contemplated that fly height controller 10FHC may be implemented in a separate integrated circuit from the data path portion of preamplifier and fly height controller 10.

As will become apparent from the following description, fly height controller 10FHC effects fly height control differently during disk read operations than during disk write operations. This separate read and write fly height control accounts for the relatively high current that is supplied to write head 35W, as compared with the relatively low read current applied to read head 35R if implemented as an MR head, or the relatively low read current induced into an inductive read head 35R. This higher write current has been observed to resistively heat write head 35W, causing it to thermally expand and reduce the fly height during write operations; conversely, the lower current levels applied or induced during read operations reduce the resistive heating and cause write head 35W to thermally contract, increasing the fly height during read operations. According to the preferred embodiment of the invention, therefore, the current applied to heat element resistor 30 is preferably higher during read operations than during write operations, to balance the relative current levels through the active heads 35W, 35R.

As shown in FIG. 4, fly height controller 10FHC includes read current register 32R and write current register 32W, each of which receive and store digital control signals, preferably from controller 5, that indicate the desired current levels to be applied to heat element resistor 30 during read and write operations, respectively. According to the preferred embodiment of this invention, as will be described below, fly height controller 10FHC applies different current levels for transitions between read and write operations, and as such the desired current level signals received by registers 32R, 32W correspond to the desired heat element resistor 30 currents during steady-state read and write operations, respectively.

Registers 32R, 32W apply their outputs to inputs of multiplexer 34, the output of which is applied to steady-state digital-to-analog converter (DAC) 36. Multiplexer 34 receives a control input from fly height control (FHC) logic 35, responsive to which multiplexer 34 selects the appropriate register 32R, 32W contents for application to steady-state DAC 36 in read and write operations, respectively. FHC logic 35 receives various control signals, for example from controller 5, including control signal RXW that indicates whether a read or write operation is active, control signal HDSEL that indicates selection of the read/write head assembly 15 associated with heat element resistor 30 being controlled by fly height controller 10FHC, and control signal FHC_EN that enables the operation of fly height controller 10FHC itself. An output of FHC logic 35 is applied as a control signal to multiplexer 34, to select the output of read current register 32R in read operations, and to select the output of write current register 32W in write operations (assuming that control signals HDSEL, FHC_EN indicate selection of this read/write head assembly 15 and enabling of fly height control).

The analog output of steady-state DAC 36 is applied to the input of voltage driver 40. Voltage driver 40 is an amplifier that drives a voltage at its output responsive to the voltage at its input from steady-state DAC 36. The gain of voltage driver 40 is preferably greater than unity, for example on the order of two, to facilitate amplifier design and preserve headroom. The output of voltage driver 40 is connected, via switch 41, to pad PAD and thus to heat element resistor 30 connected to pad PAD. Accordingly, in normal operation (with switch 40 closed to connect voltage driver 40 to pad PAD), voltage driver 40 drives heat element resistor 30 responsive to the analog output of steady-state DAC 36, which in turn corresponds to the appropriate steady-state digital signal stored by read current register 32R and write current register 32W, corresponding to the current read or write operation.

Real time monitoring of the power delivered to heat element resistor 30 is also provided in fly height controller 30, according to the preferred embodiment of the invention. The output of voltage driver 40 is also applied to current mirror 42, which is constructed in the conventional manner for current mirror circuits. Current mirror 42 and series resistor 49A define a path between the $V_{cc}$ power supply and ground. In this manner, current mirror 42 conducts a current, through resistor 49A, that corresponds to (i.e., "mirrors") the current through heat element resistor 30. The voltage across resistor 49A is applied to one input of comparator 47. A second input of comparator 47 receives the voltage across resistor 49B, which is connected between the analog output of BHV DAC 46 and ground. The output of comparator 47 corresponds to a fault signal, and is forwarded to FHC logic 35 and to fault logic elsewhere, such as in controller 5. In a measurement mode, the output voltage of BHV DAC 46 can be programmed, for example by controller 5, to match the mirrored current (when comparator 47 asserts the fault signal), at which point the programmed voltage provides a measure of the resistance of heat element resistor 30 and the power delivered to it by voltage driver 40. Conversely, during normal read and write operations, BHV DAC 46 preferably receives a control signal, for example from controller 5, corresponding to a "safe" level of current through heat element resistor 30. In this normal mode, comparator 47 will issue a fault signal if the mirrored current corresponding to the output of voltage driver 40 exceeds this safe level, responsive to which FHC logic 35 preferably disables voltage driver 40 to protect read head 35R and write head 35W. This operation is particularly useful in ensuring that the overdrive of heat element resistor 30 (between write and read operations, as described below) does not damage read and write heads 35R, 35W.

According to this embodiment of the invention, fly height controller 10FHC also includes circuitry for adjusting the current through heat element resistor 30 during transitions between read and write disk operations. These adjustments are applied in the form of relatively brief overdrive (high current to heat element resistor 30) and underdrive (low current to heat element resistor 30) pulses, each of which assist in the settling of the steady-state temperature of heads 35R, 35W for the ensuing operation. More specifically, during a transition from a read operation to a write operation, it is preferred to briefly underdrive heat element resistor 30, removing the active drive current of heat element resistor 30 prior to the higher current becoming applied through write head 35W, and the resulting heating of write head 35W, in the write operation. Conversely, during a transition from a write operation to a read operation, it is preferred to briefly overdrive heat element resistor 30, to more rapidly bring read head 35R to temperature for the read operation. The duration of the overdrive and underdrive pulses may be programmed by way of a timer, or alternatively may be manually controlled via a serial interface to fly height controller 10FHC.

In this embodiment of the invention, current source 38 applies a fixed current to its associated capacitor 38C, which has its top plate connected to an input of comparator 43 and its bottom plate at ground. Overdrive time register 39 receives a programmable value, for example from controller 5, corresponding to the desired duration of the overdrive and underdrive pulses, and applies an output signal to associated resistor 39R to define a control voltage to a second input of comparator 43. The fixed current from current source 38 to capacitor 38C generates a ramped voltage across capacitor 38C, which is compared against the voltage from overdrive time register 39 by comparator 43. Accordingly, comparator 43 generates a pulse at its output, which is applied to FHC logic 35, having a duration corresponding to the time that the ramped voltage at capacitor 38C is below the programmed voltage from overdrive time register 39. This pulse duration from comparator 43 is used to set the duration of the overdrive and underdrive pulses, as controlled by FHC logic 35.

In response to transitions between read and write operations, and to the disabling and enabling of the selected head (as indicated by control signal HDSEL), FHC logic 35 issues control signals on control line OD_L to the gate of p-channel metal-oxide-semiconductor (MOS) transistor 44P, and on control line UD to the gate of n-channel MOS transistor 44N. Transistors 44P, 44N have their source/drain paths connected in series between the $V_{cc}$ power supply and ground. The node at the drains of transistors 44P, 44N is connected to the input of voltage driver 40, and at pull-down resistor 36R. Transistors 44P, 44N are preferably sized to be capable of overriding the output signal from steady-state DAC 36.

In steady-state operation, FHC logic 35 issues inactive levels on control lines OD_L and UD (inactive levels being high and low logic levels, respectively), to keep transistors 44P, 44N both in an off state. Responsive to a transition from a write operation to a read operation, as indicated by a change of state of control signal RXW, FHC logic 35 issues an active (low logic level) pulse on control line OD_L to the gate of transistor 44P, maintaining an inactive (low level) signal on control line UD. As mentioned above, the duration of the active pulse on control line OD_L is determined by comparator 43, in response to the programmed duration in overdrive time register 39. This active pulse on control line OD_L turns on transistor 44P (transistor 44N remaining off), which drives the input of voltage driver 40 to a high voltage near or at the $V_{cc}$ power supply. This causes voltage driver 40 to apply a high voltage to heat element resistor 30 for the duration of the pulse, if monitoring comparator 47 does not issue an fault signal due to excessive drive before that time, as mentioned above.

Conversely, responsive to a transition form a read operation to a write operation, FHC logic issues an active (high level) pulse on control line UD and maintains an inactive (high level) on control line OD_L. The duration of this pulse is also determined by comparator 43, in response to the programmed duration in overdrive time register 39. During this pulse, transistor 44N is turned on while transistor 44P remains off, pulling the input to voltage driver 40 toward ground. This reduces the voltage applied to heat element resistor 30 by voltage driver 40, and thus the current through heat element resistor 30, for the duration of this underdrive pulse.

Also according to the preferred embodiment of the invention, fly height controller 10FHC also includes optional circuitry for establishing an initial state of current through heat element resistor 30. This initial state corresponds to the current to be applied to heat element resistor 30 during such time as its associated read/write head assembly 15 is not selected. Preferably, the initial state current applied to heat element resistor 30 is selected so that the switching time is minimized when its read/write head assembly 15 is selected, and also to minimize power dissipation at unselected read/write heads, as is especially important in portable computing devices.

In fly height controller 10FHC, initial state register 50 receives a digital value, for example from controller 5, that indicates the desired level of current to be applied to heat element resistor 30 during initial state time intervals, such as when the read/write head assembly 15 associated with heat element resistor 30 is not selected. This digital value stored in register 50 is applied to an input of initial state DAC 52, along with control signal IC_EN, which indicates that the initial state current level feature of fly height controller 10FHC is to be enabled. When enabled by control signal IC_EN, initial state DAC 52 generates an analog signal corresponding to the digital value from initial state register 50, and applies this analog signal to initial state voltage driver 54, which is a conventional amplifier circuit for generating a corresponding output signal that produces the desired initial state current through heat element resistor 30. Initial state voltage driver 54 may be biased to a different power supply voltage (e.g., VCC_FHC) from that biasing steady-state voltage driver 40, if desired. For example, the bias voltage VCC_FHC applied to initial state voltage driver 54 may be a lower power supply voltage, to save power. The output of initial state voltage driver 54 is connected to one pole of control switch 41; the other pole of control switch 41 in this embodiment of the invention is connected to the output of main voltage driver 40, described above. The throw of control switch 41 is connected to pad PAD, and thus to heat element resistor. Control switch 41 may be implemented in the conventional manner for integrated circuits, such as by way of MOS pass transistors in the case where fly height controller 10FHC is implemented in MOS technology.

In the operation of this initial state feature, FHC logic 35 controls the state of control switch 41 according to whether the read/write head assembly 15 containing heat element resistor 30 is selected. As mentioned above, this selection is indicated by control signal HDSEL, which is applied by controller 5 in this example. If read/write head assembly 15 is not selected, FHC logic 35 issues the appropriate signal to control switch 41 to connect the output of initial state voltage driver 54 to pad PAD. If the initial state function is enabled (by control signal IC_EN), a voltage corresponding to the digital value in initial state register 50 is applied to heat element resistor 30. Conversely, if read/write head assembly 15 is selected, FHC logic 35 places control switch 41 in its position that connects the output of main voltage driver 40 to pad PAD, so that the voltage indicated by steady-state DAC 36 is applied to pad PAD, and thus to heat element resistor 30.

As mentioned above, many modern disk drives include multiple disk surfaces, and correspondingly multiple read/write head assemblies. It may be desirable and beneficial in such disk drives to maintain unselected read/write head assemblies in an initial state from which transition to a read operation can be facilitated. In this regard, a separate fly height controller 10FHC may be provided for each read/write head assembly in each disk drive.

It is contemplated, however, that the provision of a separate fly height controller for each read/write head assembly may result in excessive power dissipation in some cases, especially for high capacity hard disk drives in portable computing equipment such as laptop personal computers. It has been observed, in connection with another aspect of the invention, that the rate at which fly height control is effected is relatively slow, as compared with the switching time of modern digital logic circuitry. According to a second preferred embodiment of the invention, therefore, a multiple-head fly-height controller provides control of the fly height of multiple read/write head assemblies in a multiplexed manner.

Figure 5:
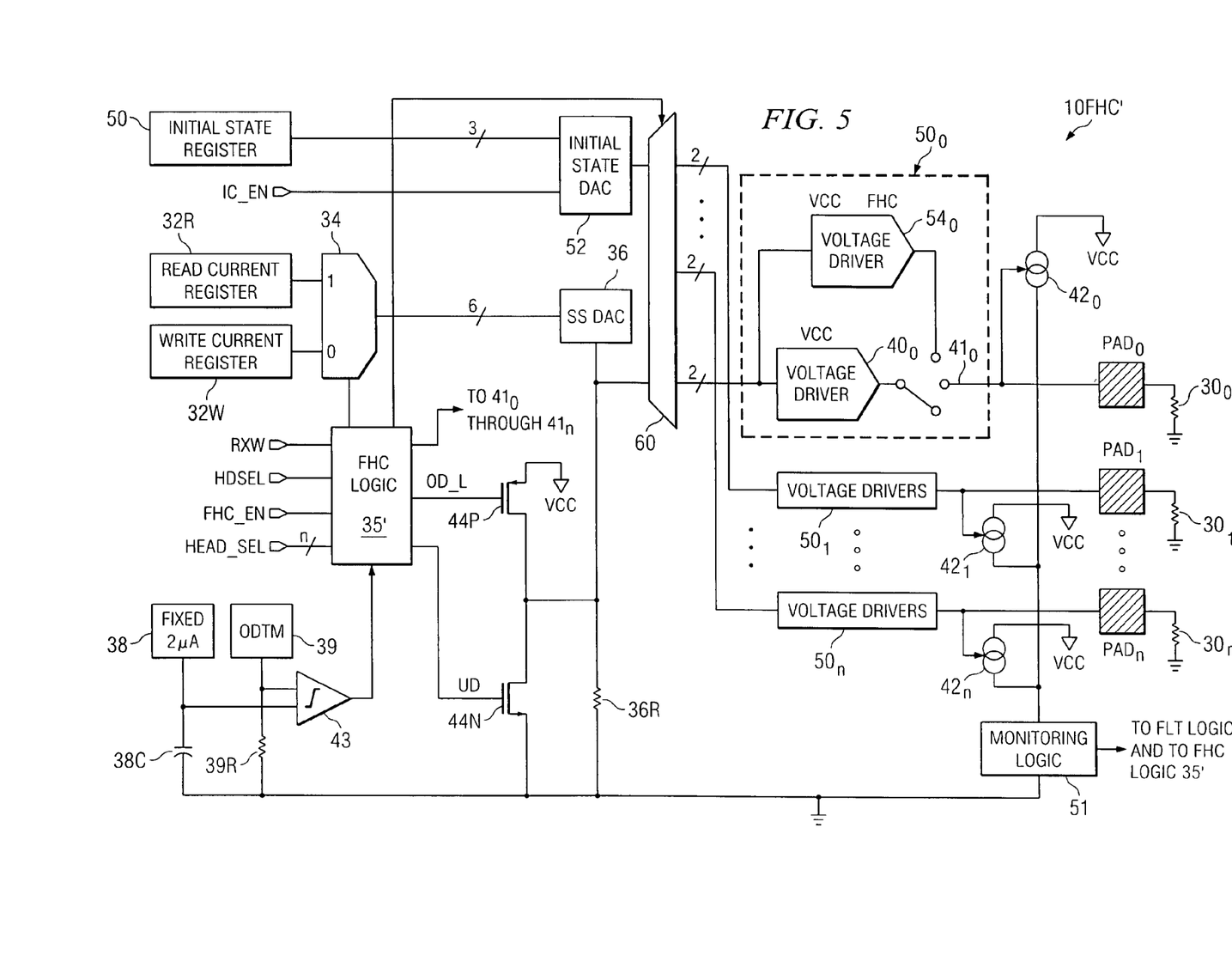
FIG. 5 is an electrical diagram, in schematic form, illustrating the construction of control circuitry for controlling a heat element resistor in multiple read/write head assemblies of a disk drive subsystem, according to a second preferred embodiment of the invention

Referring now to FIG. 5, the construction of multiple-channel fly height controller 10FHC' according to this second preferred embodiment of the invention will now be described. According to this embodiment of the invention, a single instance of many of the components of fly height controller 10FHC described above can support fly height control for multiple read/write head assemblies 15, while separate voltage drive circuits $50_0$ through $50_n$ are provided for heat element resistors $30_0$ through $30_n$ in each of the multiple read/write head assemblies.

As shown in FIG. 5, voltage drive circuit $50_0$ includes steady-state voltage driver 40, initial state voltage driver 54, and control switch 41, all constructed and operating in the similar manner as described above relative to FIG. 4. The other voltage drive circuits $50_1$ through $50n$ are preferably similarly constructed. Accordingly, each voltage drive circuit 50 receives three control inputs, one being a steady-state voltage drive control signal applied to steady-state voltage driver 40, one being an initial state control signal applied to initial state voltage driver 54, and one being a control signal applied to control switch 41 to select which voltage driver output to be forwarded to its corresponding pad PAD and heat element resistor 30.

According to this embodiment of the invention, these control inputs applied to each voltage drive circuit 50 are generated from shared instances of many components in fly height controller 10FHC'. To the extent that these components are effectively identical to those in fly height controller 10FHC described above, these will be referred to in FIG. 5 by the same reference numerals as used in FIG. 4. In this implementation, steady-state DAC 36 and its input sources of read and write current registers 32R, 32W, and multiplexer 34, provide the steady-state read and write control voltages for all of voltage drive circuits 50. Similarly, initial state DAC 52 and initial state register 50 provides the initial state control voltage for all of voltage drive circuits 50. Overdrive transistor 44P and underdrive transistor 44N provide overdrive and underdrive voltages for all of voltage drive circuits 50 in this embodiment of the invention, while comparator 43 provides the overdrive and underdrive pulse width timing for all of voltage drive circuits 50.

The ability to control multiple heat element resistors $30_0$ through $30_n$ according to this embodiment of the invention is provided by demultiplexer 60 and modified FHC logic 35'. In addition to the previously described inputs, FHC logic 35' also receives, in this embodiment of the invention, a multiple-bit digital signal on lines HEAD_SEL that indicates which of the read/write head assemblies 15 (if any) is activated for a read or write operation. FHC logic 35' issues control signals to switches $41_0$ through $41_n$ in voltage drive circuits $50_0$ through $50_n$, respectively, to select the appropriate one of steady-state voltage driver 40 or initial state voltage driver 54 in each of voltage drive circuits $50_0$ through $50_n$ according to the signal on lines HEAD_SEL. In addition, according to this embodiment of the invention, FHC logic 35' includes timing logic for generating the select control signals that are applied to demultiplexer 60. Demultiplexer 60 receives the voltage control signals from the output of steady-state DAC 36 and from the output of initial state DAC 52, and applies these voltage control signals in a time-multiplexed fashion to voltage drive circuits $50_0$ through $50_n$, under the timing control of FHC logic 35'. It is contemplated that the response of voltage drive circuits $50_0$ through $50_n$ and of heat element resistors $30_0$ through $30_n$ is sufficiently slow, relative to the switching capability of demultiplexer 60, that this time-multiplexed control of the application of the voltage control signals will adequately maintain fly height control for each of the multiple read/write head assemblies 15.

Also according to this embodiment of the invention, monitoring logic 51 also preferably monitors the voltages at each of pads $PAD_0$ through $PAD_n$ in a time-multiplexed fashion. In this exemplary implementation, a dedicated current mirror $42_0$ through $42n$ is provided at the output of each of voltage drive circuits $50_0$ through $50_n$, for providing a mirrored current to monitoring logic 51. Monitoring logic 51 is preferably constructed in the manner described above, for example including a BHV DAC for generating one or more reference levels, and a comparator for comparing a voltage derived from the mirrored current against the reference levels, along with the appropriate multiplexing circuitry for selecting the mirrored current to be monitored. As before, monitoring logic 51 preferably generates output signals that are applied to FHC logic 35' and to fault logic in controller 5.

According to this second preferred embodiment of the invention, the additional benefits of providing separate fly height control in each of multiple read/write head assemblies, while minimizing the power dissipation and circuit complexity required for such control by sharing the control logic and digital-to-analog converters among the multiple heads. In this way, the previously described advantages of programmable fly height control current for read and write operations, automatic programmable overdrive and underdrive levels for in transitions between read and write operations, and the inclusion of initial state drive level for the heat element resistor in unselected read/write heads, are provided for multiple heads in an efficient and cost-effective manner.

Figure 6:
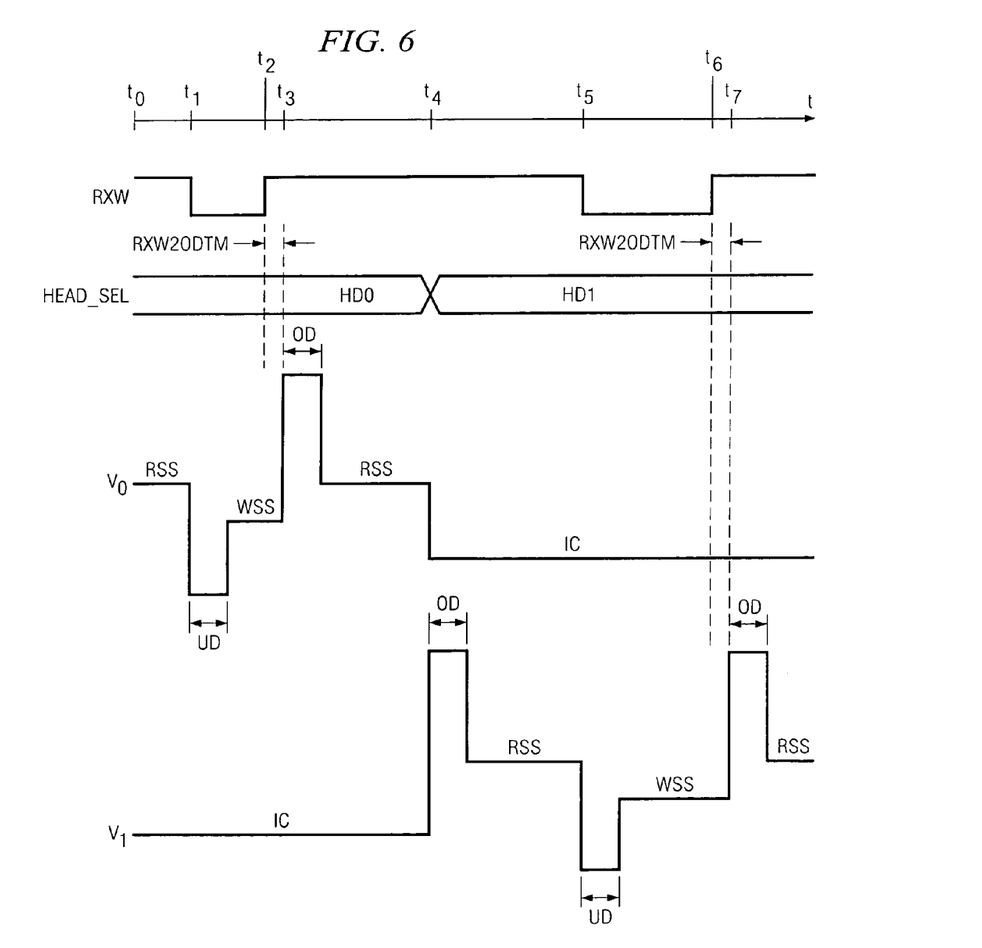
FIG. 6 is a timing diagram, illustrating the operation of the control circuitry of FIG. 5 according to the second preferred embodiment of the invention.

Referring now to FIG. 6, an example of the operation of multi-channel fly height controller 10FHC' over a sequence of typical operational cycles will now be described. Of course, the particular sequence of operations encountered in practice will differ from that illustrated in FIG. 6, and the particular current levels to be applied to heat element resistor $30_0$, $30_1$ may differ from those relative levels indicated in FIG. 6. It is contemplated that those skilled in the art having reference to this specification will readily comprehend, from this exemplary description, both how the preferred embodiment of the invention operates and also various alternative implementations for specific applications. The particular example illustrated in FIG. 6 shows the fly height control operation for the case of two hard disk drive heads (HD0 and HD1) within a single disk drive 20, for which the fly height is controlled by associated heat element resistors $30_0$, $30_1$. It is contemplated that those skilled in the art, having reference to this specification, will readily comprehend the operation of single-channel fly height controller 10FHC of FIG. 4, as well as the operation of multi-channel fly height controller 10FHC' for more than two channels, from this description of the operation of multi-channel fly height controller 10FHC' for two channels.

At the beginning of this exemplary time sequence, shown at time to in the timing diagram of FIG. 6, a read operation is being carried out using head HD0. As such, control signal RXW is at a high logic level, indicating that a read is being requested, and control signal HEAD_SEL is at the appropriate state to select head HD0 (e.g., a high logic level applied to head HD0 and a low logic level to head HD1 as well as any other heads in the same hard drive 20, or alternatively by way of an encoded digital word that is decodable by each of heads HD0, HD1). As a result, with reference to FIG. 4 by way of example, fly height controller 10FHC' is applying the digital word stored in read current register 32R to steady-state DAC 36, via multiplexer 34, and an analog signal from steady-state DAC 36 is applied to voltage driver 40. Because head HD0 is selected, FHC logic 35' in fly height controller 10FHC' controls demultiplexer 60 to apply the output of steady-state DAC 36 to voltage drive circuit $50_0$, within which control switch $41_0$ selects the output of voltage driver $40_0$ for application to pad $PAD_0$, and thus to the heat element resistor $30_0$ associated with head HD0. This voltage output $V_0$, for head HD0, at this time is shown as voltage level RSS (read steady-state), corresponding to the contents of read current register 32R. Monitoring of the current through heat element resistor $30_0$ by way of current mirror 420 and monitoring logic 51 may be carried out as desired.

Also during this time, with an active initial state enable control signal IC_EN, FHC logic 35 in fly height controller 10FHC' controls demultiplexer 60 to apply, in a time-multiplexed fashion, the output of initial state DAC 52 applies corresponding to the contents of initial state register 50 to initial state voltage driver $54_1$ in voltage drive circuit $50_1$, associated with the unselected head HD1. Voltage drive circuit $50_1$ has placed its control switch $41_1$ in the position to connect the output of initial state voltage driver $54_1$ to pad $PAD_1$. The desired voltage level IC is thus applied through control switch $41_1$ to pad $PAD_1$ and to heat element resistor $30_1$, as illustrated in FIG. 6 by voltage $V_1$ for head HD1. This state continues until the selection of head HD1 (at time $t_4$ in FIG. 6). In this initial state, monitoring of the initial state current through heat element resistor $30_1$ by way of current mirror $42_1$ and monitoring logic 51 may be carried out as desired.

Referring back to the sequence for selected head HD0, control signal RXW makes a transition at time $t_1$ to initiate a write operation at head HD0. In response to this transition, FHC logic 35' operates to change the state of multiplexer 34 to now select the digital value from write current register 32W for application to steady-state DAC 36, based upon which the output voltage will switch to voltage level WSS. Meanwhile, also responsive to the transition of control signal RXW at time $t_1$, FHC logic 35' issues an active (high) level on line UD to the gate of transistor 44N, for the duration indicated by comparator 43 in response to the voltage at capacitor 38C and overdrive time register 39, which applies a low voltage via demultiplexer 60 to the input of voltage driver $40_0$, overriding the output of steady-state DAC 36. For this duration, as shown in FIG. 6 beginning from time $t_1$, underdrive voltage UD is applied to pad $PAD_0$ and thus to heat element resistor $30_0$ for the selected head HD0. Upon expiration of the underdrive pulse, transistor 44N turns off again, and the output of steady-state DAC 36 applies the write steady-state voltage WSS as the output voltage $V_0$ at pad $PAD_0$. In this embodiment of the invention, write steady-state voltage WSS is lower than read steady-state voltage RSS, to balance the relatively higher current that is supplied to write head 25W (and the resulting higher level of resistive heating and thermal expansion of write head 25W). Underdrive voltage level UD assists in the settling of the temperature of head $HD_0$ upon this transition to a write operation.

At time $t_2$, control signal RXW makes another transition, this time back to the high level indicating a read operation. According to the preferred embodiment of the invention, FHC logic 35' in fly height controller 10FHC' includes a delay stage that delays its response to a write-to-read transition for a selected (preferably programmable) time delay RXW2ODTM, prior to initiating its write operation functions. This delay period prevents the overdrive and overheating of its read/write head assembly 15 that can occur from response to an extremely short read operation. Following the expiration of this time delay RXW2ODTM, at time $t_3$, since control signal RXW has remained high in this example, FHC logic 35' issues an active (low) level on control line OD_L for the pulse duration indicated by comparator 43, turning on transistor 44P and applying a high voltage, via demultiplexer 60, to the input of voltage driver $40_0$, overriding the output of steady-state DAC 36 and resulting in overdrive voltage level OD being driven by voltage driver $40_0$ through control switch $41_0$ to heat element resistor $30_0$. Meanwhile, FHC logic 35' (after the expiration of time delay RXW2ODTM) controls multiplexer 34 to select the contents of read current register 32R for application to steady-state DAC 36. In response, voltage driver $40_0$ outputs read steady-state voltage RSS to heat element resistor $30_0$, as shown in FIG. 6.

In the example of FIG. 6, head HD1 becomes selected at time 4, at which time head HD0 is deselected, as indicated by control signals HEAD_SEL. In response to this event, FHC logic 35' in fly height controller 10FHC controls demultiplexer 60 to apply the output of initial state DAC 52 to voltage drive circuit $50_0$, and to control voltage drive circuit $50_0$ to cause its control switch $41_0$ to select the output of initial state voltage driver $54_0$ rather than its main voltage driver $40_0$, for application to pad PAD. This output voltage $V_0$ thus corresponds to the analog output of initial state DAC 52, and appears at pad $PAD_0$ and heat element resistor $30_0$ as initial state voltage IC, as shown in FIG. 6 for head HD0.

Conversely, for head HD1, because a read operation is indicated by control signal RXW, fly height controller 10FHC initiates control for the read operation by first issuing an overdrive voltage OD for the desired duration, via demultiplexer 60 and voltage drive circuit $50_1$, and then settling its output $V_1$ to read steady-state voltage RSS as shown. The operation of fly height controller 10FHC' continues for the read and write operations as illustrated in FIG. 6, in similar manner as described above for the case of selected head HD0 described above. During this time, as shown, fly height controller 10FHC' controls demultiplexer 60 and voltage drive circuit $50_0$ to issue initial state voltage IC to heat element resistor $30_0$.

According to this preferred embodiment of the invention, therefore, important advantages are provided in controlling the fly height of read/write head assemblies in hard disk drives. As described above relative to this exemplary embodiment, the current conducted by a heat element resistor at the head assembly may be separately controlled for read and write operations, and may be so controlled in a programmable manner. Overdrive and underdrive levels for the heat element resistor current in transitions between read and write operations are enabled, and can occur in substantially an automatic manner, through implementation of the preferred embodiment of the invention. In addition, if desired, an initial state drive level for the heat element resistor for unselected hard drives, and unselected read/write heads, is also provided. These advantages may be attained in an efficient manner, by way of relatively simple logic circuitry that may be implemented along with other functions, such as in a combined preamplifier and fly height controller integrated circuit.

The multi-channel implementation described above provides the additional benefits of providing separate fly height control in each of multiple read/write head assemblies, while minimizing the power dissipation and circuit complexity required for such control by sharing the control logic and digital-to-analog converters among the multiple heads. In this way, programmable fly height control current for read and write operations, automatic programmable overdrive and underdrive levels for in transitions between read and write operations, and the inclusion of initial state drive level for the heat element resistor in unselected read/write heads, are provided for multiple heads in an efficient and cost-effective manner.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A circuit for controlling the fly height of a disk drive read/write head assembly by controlling a current applied to a heat element resistor in the read/write head assembly, comprising:
   a first voltage driver, having an output coupled to a terminal, the terminal for coupling to the heat element resistor;
   a read current input for receiving a read current signal corresponding to a desired read current;
   a write current input for storing a write current signal corresponding to a desired write current; and
   control circuitry for coupling the read current signal and the write current signal to an input of the first voltage driver in read and write disk operations, respectively.

2. The circuit of claim 1, wherein the control circuitry comprises:
   a read current register, coupled to the read current input, for storing a digital read current data value corresponding to the read current signal;
   a write current register, coupled to the write current input, for storing a digital write current data value corresponding to the write current signal;
   a steady-state digital-to-analog converter, having an input for receiving a digital value and an output coupled to the first voltage driver; and
   select circuitry for selectively applying the read and write current data values to the input of the steady-state digital-to-analog converter in read and write disk operations, respectively.

3. The circuit of claim 2, wherein the select circuitry comprises:
   a multiplexer, having an input coupled to the read current register and an input coupled to the write current register; and
   control logic, having an input for receiving a read/write control signal, and having an output coupled to a control input of the multiplexer, for controlling the multiplexer responsive to the read/write control signal.

4. The circuit of claim 3, further comprising:
   an overdrive transistor, having a conduction path coupled between an input of the first voltage driver and a first voltage, and having a control terminal; and
   an underdrive transistor, having a conduction path coupled between an input of the first voltage driver and a second voltage, and having a control terminal;
   and wherein the control logic also has outputs coupled to the control terminals of the overdrive and underdrive transistors, and is also for controlling the overdrive and underdrive transistors to conduct responsive to transitions of the read/write control signal.

5. The circuit of claim 4, further comprising:
   timing circuitry, coupled to the control logic, for applying a pulse of a selected duration to the control logic;

and wherein the control logic controls the overdrive and underdrive transistors to conduct for a selected duration, responsive to the pulse from the timing circuitry.

6. The circuit of claim 4, wherein the control logic controls the overdrive transistor to conduct responsive to the read/write control signal indicating a transition from a write disk operation to a read disk operation;

and wherein the control logic controls the underdrive transistor to conduct responsive to the read/write control signal indicating a transition from a read disk operation to a write disk operation.

7. The circuit of claim 1, further comprising:

a second voltage driver, having an input and an output;

an initial state current input, coupled to an input of the second voltage driver, for receiving an initial state current signal corresponding to a desired initial state current; and a control switch, for selectively coupling the output of the first and second voltage drivers to the terminal;

and wherein the control circuitry comprises:

control logic is also for controlling the control switch so that the output of the second voltage driver is coupled to the terminal responsive to the control logic receiving an inactive disk drive enable signal, and so that the output of the first voltage driver is coupled to the terminal responsive to the control logic receiving an active disk drive enable signal.

8. The circuit of claim 7, further comprising:

an initial state register, for storing a digital initial state current data value corresponding to the initial state current signal received at the initial state current input; and an initial state digital-to-analog converter, having an input coupled to an output of the initial state register and an output coupled to the second voltage driver.

9. The circuit of claim 8, wherein the second voltage driver is biased by a second power supply voltage that is lower than a first power supply voltage biasing the first voltage driver.

10. The circuit of claim 1, further comprising:

circuitry for monitoring current driven from the terminal.

11. The circuit of claim 10, wherein the monitoring circuitry comprises:

a current mirror, having a control input coupled to the terminal, for generating a mirrored current corresponding to the current driven from the terminal; and a comparator, for receiving a mirror input signal corresponding to the mirrored current, for generating a signal to the control circuitry responsive to the mirrored current.

12. The circuit of claim 11, wherein the monitoring circuitry further comprises:

limit circuitry, coupled to the comparator, for providing a limit value;

and wherein the comparator issues a fault signal responsive to a comparison of the mirror input signal to the limit value.

13. The circuit of claim 11, further comprising:

circuitry for providing a varying target voltage to the comparator;

and wherein the comparator issues a signal responsive to the mirror input signal matching the target voltage, so that the resistance of the heat element resistor can be calculated from the target voltage responsive to which the comparator issues the signal.

14. The circuit of claim 1, wherein the first voltage driver has a gain greater than unity.

15. A circuit for controlling the fly height of a plurality of disk drive read/write head assemblies by controlling a current applied to a heat element resistor in each of the plurality of read/write head assemblies, comprising:

a plurality of output voltage drive circuits, each having an input, and each having an output coupled to a corresponding one of a plurality of terminals, each of the plurality of terminals for coupling to a corresponding one of the plurality of heat element resistors;

a read current input for receiving a read current signal corresponding to a desired read current;

a write current input for storing a write current signal corresponding to a desired write current;

a demultiplexer circuit, having a first input for receiving a steady-state current signal, having a plurality of outputs, each coupled to an input of one of the plurality of output voltage drive circuits, and having at least one control input; and control circuitry for coupling the read current signal and the write current signal to the input of the demultiplexer circuit as the steady-state current signal in read and write disk operations, respectively, and for controlling the demultiplexer circuit to apply the steady-state current signal to a selected one of the plurality of output voltage drive circuits responsive to a head select signal.

16. The circuit of claim 15, wherein the control circuitry comprises:

a read current register, coupled to the read current input, for storing a digital read current data value corresponding to the read current signal;

a write current register, coupled to the write current input, for storing a digital write current data value corresponding to the write current signal;

a steady-state digital-to-analog converter, having an input for receiving a digital value and an output coupled to the first voltage driver;

select circuitry having inputs coupled to the read and write current registers, having an output coupled to the steady-state digital-to-analog converter, and having a control input; and control logic, having a first input for receiving a read/write control signal, and having an output coupled to the control input of the select circuitry, for controlling the select circuitry responsive to the read/write control signal, the control logic also having a second input for receiving the head select signal, and having an output coupled to the control input of the demultiplexer circuit for controlling the demultiplexer circuit responsive to the head select signal.

17. The circuit of claim 16, wherein each of the plurality of output drive circuits comprise:

a steady-state voltage driver, having an input coupled to a first input to the output drive circuit;

an initial state voltage driver, having an input coupled to a second input to the output drive circuit; and a control switch, having a control input;

and further comprising:

an initial state register, for storing a digital initial state current data value corresponding to the initial state current signal received at the initial state current input; and an initial state digital-to-analog converter, having an input coupled to an output of the initial state register and an output coupled to a second input to the demultiplexer circuit;

wherein the demultiplexer circuit has a plurality of outputs coupled to the first and second inputs of the plurality of output voltage drive circuits;

and wherein the control logic is also coupled to the control inputs of each of the control switches in the plurality of output drive circuits, so that the control switch in the selected one of the plurality of output voltage drive circuits couples the steady-state voltage driver to its corresponding terminal, and so that the control switch in each of the unselected ones of the plurality of output voltage drive circuits couples the initial state voltage driver to its corresponding terminal.

18. A method of controlling the fly height of a read/write head assembly in a disk drive, comprising:
   connecting a first terminal to a first heat element resistor in a first read/write head assembly;
   during at least a portion of a disk read operation, applying a first voltage to the first terminal;
   during at least a portion of a disk write operation, applying a second voltage to the first terminal,
   storing a read current value;
   storing a write current value;
   wherein the step of applying the first voltage comprises:
   responsive to receiving a disk read enable signal, applying a signal corresponding to the read current value to a first voltage driver, the first voltage driver having an output coupled to the first terminal;
   and wherein the step of applying the second voltage comprises:
   responsive to receiving a disk write enable signal, applying a signal corresponding to the write current value to the first voltage driver.

19. The method of claim 18, wherein the disk drive includes a plurality of read/write head assemblies;
   and further comprising:
   connecting a plurality of terminals to corresponding ones of a plurality of heat element resistors, each heat element resistor in a corresponding one of the plurality of read/write head assemblies; and
   receiving a head select signal indicating a selected one of the plurality of read/write head assemblies;
   wherein the steps of applying a first voltage and of applying a second voltage to a first terminal are performed responsive to the head select signal indicating selection of the first read/write assembly is selected.

20. The method of claim 19, further comprising, responsive to the head select signal indicating selection of a second read/write head assembly;
   during at least a portion of a disk read operation, applying a first voltage to the second terminal; and
   during at least a portion of a disk write operation, applying a second voltage to the second terminal.

21. The method of claim 20, further comprising:
   for each of the plurality of read/write head assemblies indicated by the head select signal as not selected, applying an initial state voltage to its corresponding terminal.

22. A method of controlling the fly height of a read/write head assembly in a disk drive, comprising:
   connecting a first terminal to a first heat element resistor in a first read/write head assembly;
   during at least a portion of a disk read operation, applying a first voltage to the first terminal; and
   during at least a portion of a disk write operation, applying a second voltage to the first terminal,
   wherein the disk read enable signal and disk write enable signals correspond to logic levels at a read/write enable terminal;
   and further comprising:
   responsive to detecting a first logic level transition at the read/write enable terminal, coupling an underdrive voltage to the first voltage driver; and
   responsive to detecting a second logic level transition at the read/write enable terminal, coupling an overdrive voltage to the first voltage driver.

23. The method of claim 22, wherein the first logic level transition corresponds to a transition from a disk read operation to a disk write operation;
   and wherein the second logic level transition corresponds to a transition from a disk write operation to a disk read operation.

24. A method of controlling the fly height of a read/write head assembly in a disk drive, comprising:
   connecting a first terminal to a first heat element resistor in a first read/write head assembly;
   during at least a portion of a disk read operation, applying a first voltage to the first terminal;
   during at least a portion of a disk write operation, applying a second voltage to the first terminal; and
   monitoring a mirrored current corresponding to current driven at the first terminal.

25. The method of claim 24, wherein the monitoring step comprises:
   comparing the mirrored current to a limit value; and
   responsive to the mirrored current exceeding the limit value, issuing a fault signal.

26. A method of controlling the fly height of a read/write head assembly in a disk drive, comprising:
   connecting a first terminal to a first heat element resistor in a first read/write head assembly;
   during at least a portion of a disk read operation, applying a first voltage to the first terminal;
   during at least a portion of a disk write operation, applying a second voltage to the first terminal; and
   responsive to receiving a signal indicating that the disk drive is not selected, applying an initial state voltage to the first terminal.

* * * * *